United States Patent [19]

Wu

[11] Patent Number: 4,782,578
[45] Date of Patent: Nov. 8, 1988

[54] PNEUMATIC WIRE STRIPPING AND TWISTING MACHINE

[76] Inventor: Txay Jaw Wu, No. 11, Lane 19, Sec. 3, Chung-san Rd., Taichung, Taiwan

[21] Appl. No.: 49,793

[22] Filed: May 15, 1987

[30] Foreign Application Priority Data

Mar. 27, 1987 [TW] Taiwan ............... 76202705

[51] Int. Cl.$^4$ ............................ H01R 43/28
[52] U.S. Cl. ..................... 29/564.4; 29/762; 140/1; 140/149
[58] Field of Search ........... 29/33 M, 564.1, 564.4, 29/762; 140/1, 149

[56] References Cited

U.S. PATENT DOCUMENTS

| | | | |
|---|---|---|---|
| 3,505,720 | 4/1970 | Heimbrock | 29/564.4 |
| 3,626,431 | 12/1971 | Thierri et al. | 29/564.4 |
| 3,750,720 | 8/1973 | Steigerwald | 140/149 |
| 4,109,553 | 8/1978 | Drinkard, Jr. et al. | 140/1 X |
| 4,403,383 | 9/1983 | Dewhurst et al. | 29/564.4 X |

Primary Examiner—Gil Weidenfeld
Assistant Examiner—Steven C. Bishop
Attorney, Agent, or Firm—Holman & Stern

[57] ABSTRACT

A pneumatic wire stripping machine has wire clamping jaws and insulation cutting jaws. The respective jaws are operated by respective pneumatic cylinders. Additionally, there is a third pneumatic cylinder for moving the cutting jaws lengthwise relative to the clamping jaws so as to strip insulation from one end of the wire. A sequence control valve is provided for ensuring that the stripping cylinder only operates after the wire has been properly clamped and the insulation cut. Further, there may be provided, a twisting jaw arrangement for twisting the wire as it is stripped.

10 Claims, 3 Drawing Sheets

PNEUMATIC WIRE STRIPPING AND TWISTING MACHINE

BACKGROUND OF THE INVENTION

The present invention relates to a pneumatic stripping and twisting machine for electric wire.

Electric wires conventionally have been manually stripped with stripping pliers. Recently, automatic strippers were adopted for upgrading the work efficiency. Nevertheless, such automatic strippers still suffer from the following disadvantages:

1. Wires to be worked in the stripper are clamped and have the insulation cut by a clamp device and a cutter device respectively, which are operated by pneumatic pressure. Then the cutter device is translated for stripping the insulation from the wire. In operation, it often happens that the cutter device starts to move before the clamp seat and the cutter seat have positively clamped and cut the wire, causing improper stripping or even a failure to strip.

2. Known strippers generally can only strip a wire and do not have the capability of wire twisting. As the strands of wires usually disperse after the wires are stripped, they should be twisted together for the purpose of soldering if a satisfactory solder effect is to be obtained.

It is therefore an object of the invention to overcome the above disadvantages.

SUMMARY OF THE INVENTION

A preliminary object of the invention is to provide a pneumatic wire stripping and twisting machine wherein the cutter device can only be driven to move and strip insulation from wires after the clamp device and the cutter device have positively clamped and cut the wires, so as to ensure reliable stripping.

A secondary object of the invention is to provide a pneumatic wire stripping and twisting machine which can provide a wire twisting function simultaneously with the process of wire stripping so that the strands of wire can be twisted together to facilitate satisfactory soldering thereof.

Another object of the invention is to provide a pneumatic wire stripping and twisting machine which can strip and return to its original position quickly for upgrading its stripping work efficiency.

A feature of the invention is that air intake piping for the stripping and twisting machine is provided with a sequence control device which supplies intake air first to a wire clamping cylinder of a clamping device and to a wire-cutting cylinder of the cutter device until the wire has been positively clamped and cut, and only then, when the air pressure in the air intake piping has risen a predetermined value, the intake air is supplied to a stripping cylinder to move the cutter device relative to the clamping device.

A second feature of the invention is that a twisting device maybe installed on the cutter device, so that in the process of cutting the insulation, a pneumatic clamp holds the insulation to be stripped and subsequently rotates the wire relative to the clamping device as it is stripped.

Another feature of the invention is that the sequence control device, when the clamp cylinder and the cutter cylinder have completed their respective operations, immediately opens an exhaust vent for quick exhaust of intake air, causing the cutter device rapidly to return to its original position.

A further feature of the invention is that the stripping cylinder (including the cutter device) may be slidably mounted on a pair of parallel circular rods for steady reciprocation thereon.

DETAILED DESCRIPTION OF THE PREFERRED EMBODIMENT

Figure 1:
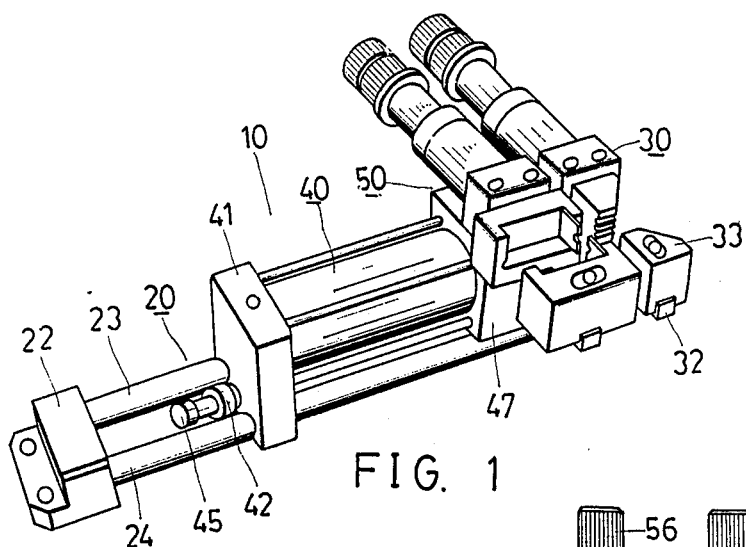
FIG. 1 is a perspective view of the pneumatic wire stripper of the invention.

Referring now to FIG. 1, the wire stripper 10 includes a slide rail base 20 with slide rails 23, 24, a clamping device 30, a stripping cylinder 40 and a cutter device 50, the detailed constructions of which are described below.

Figure 2:
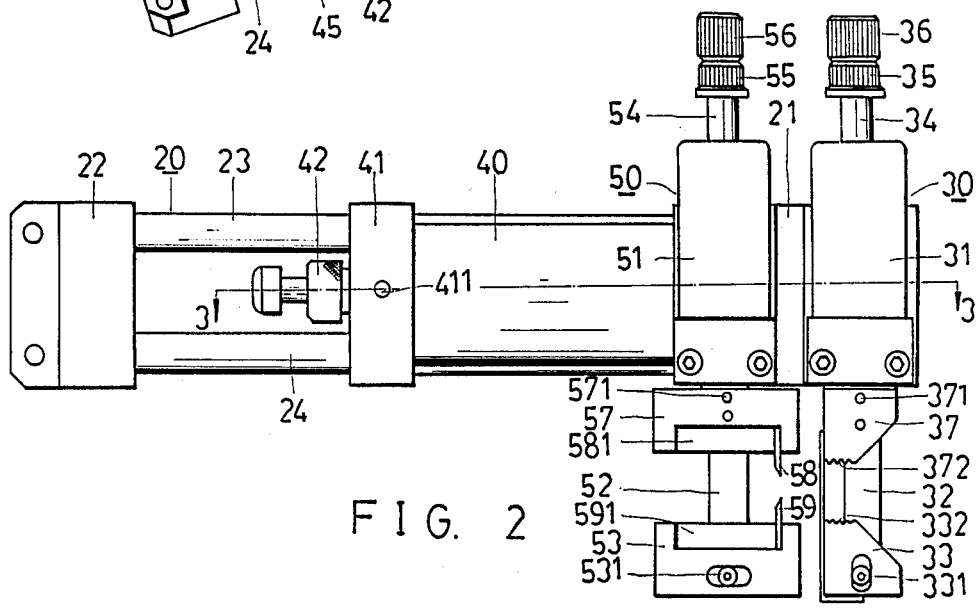
FIG. 2 is a plan view of the stripper.
Figure 3:
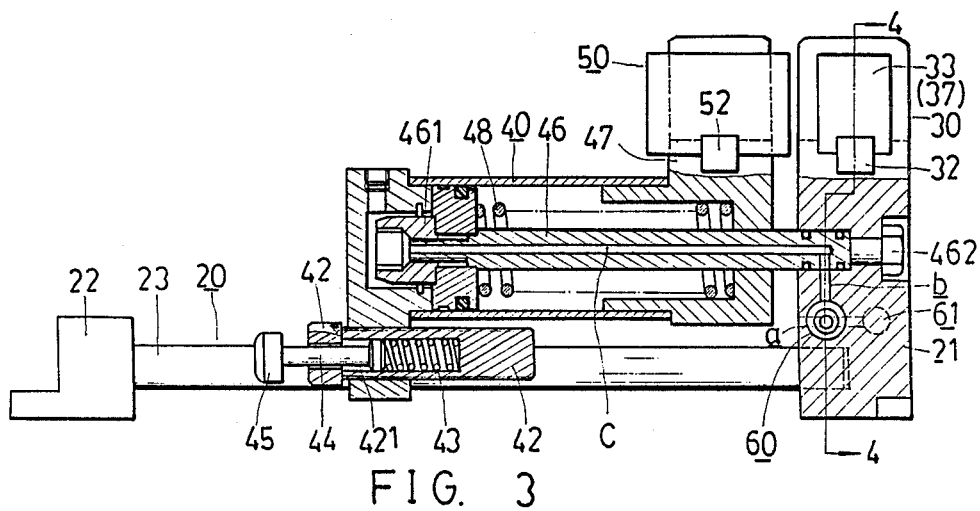
FIG. 3 is a cross-sectional view taken along line 3—3 in FIG. 2.

As shown in FIGS. 1, 2 & 3, the slide rails are formed by two parallel round rods 23, 24 installed between two (left/right), stationary base blocks 21, 22 with stationary block 21 firmly housing respective ends of rods 23, 24 and also carrying a wire clamping device 30 thereon.

The clamping device 30 includes a wire clamping cylinder 30 and a rectangular-section slide rail 32 which are both fixed on a stationary block 21. At the front end of the slide rail 32, a stationary block 33 is fixed thereto by a screw 331. At the rear end of a piston rod 34 of wire clamping cylinder 31, an adjusting knob 36 is installed, while at its front end the piston rod 34 carries a movable clamp block 37, fixed thereto with a screw 371. The bottom of the clamp block 37 has a U-shaped cross-section so as to securely ride on the slide rail 32. Clamp block 37 can be driven toward stationary block 33 for clamping engagement therewith. Blocks 33, 37 have toothed clamping surfaces 332, 372.

The stripping cylinder 40 is a comparatively larger air cylinder having at one end, an end cover 41 which is extended downwardly and which is slidably mounted on the rods 23, 24 for movement therealong in its axial direction. A buffer device is provided including a bolt 42 screwed centrally in the lower end of cover 41. From one end, bolt 42, is bored with a round hole 421, to accomodate a spring 43. One end of a buffer pin 44 is positioned inside of the hole 421 for engagement against spring 43, and the other end of pin 44 is attached to a rubber buffer block 45. Further, one end of the piston rod 46 has a buffer part 461, while the other end of rod 46 is fixed on stationary block 21 by a nut 462. Another end cover, of generally L-shaped form, extends upwardly at the other end of cylinder 40 with the top surface thereof firmly housing thereon a wire cutting device 50.

The wire cutting device 50 includes a wire cutting cylinder 51 and a rectangular-section slide rail 52, both installed firmly on end cover 47. The front end of slide rail 52 has fixed thereon a cutter block 53 with a screw 531. At the rear end of the piston rod 54 of the wire cutting cylinder 51, there is installed an adjusting knob 55 and a stationary knob 56, while at its front end, a slidable cutter block 57 is fixed thereon by a screw 571. The bottom of the cutter block 57 has a U-shaped cross-section in order to securely ride on the slide rail 52 and block 57 can be driven toward another cutter block 53 for cutting engagement therewith. The facing surfaces of blocks 57, 53, have cutter blades 58, 59 with arcuati cutting edges, fixed therein by respective plates 581, 591.

The operation of the wire stripper is as follows:

Initially, one end of an insulated wire to be worked is located in the clamping and cutting devices 30, 50 in a predetermined position from which insulation is to be stripped. Then the clamping cylinder 31 and cutting cylinder 51 act simultaneously so that clamp blocks 33, 37 firmly clamp the wire with toothed surfaces 332, 372 and cutter blades 58, 59 cut into the insulation coating of the wire. Thereafter, wire stripping cylinder 40 operates, causing cutting device 50 to move leftwards and the cutter blades 58, 59 to strip the insulating coating for a predetermined length off one end of the wire. Such stripping action is similar to that of a conventional apparatus and need not be described in further detail.

A distinctive feature of the invention is the installation of a sequence control device 60 in the wire stripper 10.

Figure 4:
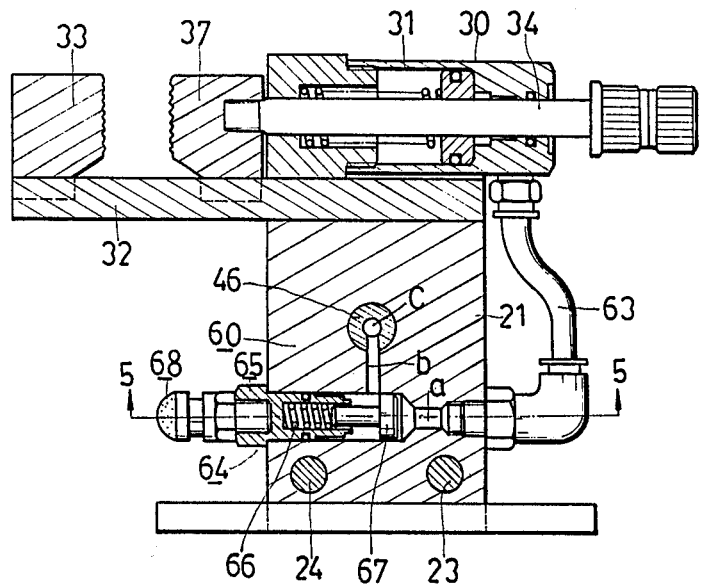
FIG. 4 is a sectional view taken along line 4—4 in Fig. 3.
Figure 5:
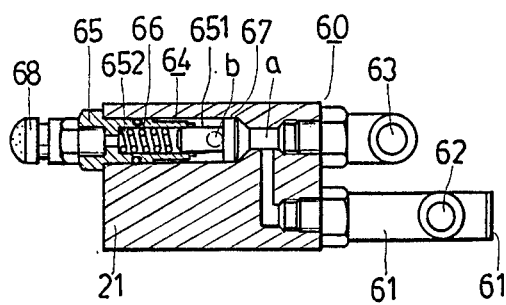
FIG. 5 is a sectional view taken along line 5—5 in Fig. 4.

As shown in FIGS. 3, 4 & 5, an air intake pipe 61 for the sequence control device 60 is connected to a pedal-type air supply switch (which is conventional and is not shown in the figures) so that air can pass directly, via two pipes 62, 63, to the air intake pipes of clamping cylinder 31 and cutting cylinder 51 respectively. When the pedal switch is depressed to supply air to the air intake pipe 61, the intake air instantly drives wire clamping cylinder 31 and wire cutting cylinder 51 to perform the clamping and cutting actions. The cylinders 31 and 51 are single-acting cylinders and the respective piston rods will be instantly returned to their original positions by respective springs therein when the air pressure therein is released. The air intake pipe 61 communicates with passage sections a, b formed in the stationary block 21 and a passage section formed axially through piston rod 46, which communicates with section b, in order to supplt air to the wire stripping cylinder 40 to drive the wire stripping cylinder body 40 and wire cutting device 50 to the left. Between passage sections a, b in the stationary block 21, there is provides a sequence valve 64 having a bolt 65 screwed into a bore 651 of the stationary block 21 communicating with holes a, b. An axial bore 652 in bolt 65 accomodates a spring 66 and a piston 67. A governor 68 is fixed to the outer end of bolt 65.

The main function of the sequence control device 60 is as follows: when intake pipe 62 is supplied with air, the air operates wire clamping cylinder 31 and wire cutting cylinder 51. Before the blocks 33, 37 or the blocks 53, 57 have been suitably clamped together, the air is unable to enter hole b via hole a, because the air pressure at hole a is not sufficient to overcome the force of spring 66 urging piston 67 to close passage b. Upon completion of the actions of clamping and cutting a wire, by means of clamping cylinder 31 and wire cutting cylinder 51, and the air pressure in hole a having been kept at a constant pressure for a time, the air pressure in hole a rises sufficiently to overcome the force of spring 66 and depress piston 67 thereby connecting passage b with passage a. This in turn, directs air to the left end of piston rod 46 via passage c for pushing the wire stripping cylinder 40 leftwards along the rods 23, 24 (FIG. 3), causing the wire cutting device 50 to complete the wire stripping function and moderating collision between end cover 41 and stationary block 22 by means of the buffer device 42–45. Thus, with the provision of sequence control device 60 in the wire stripper 10, the wire stripping cylinder 40 is only able to perform the wire stripping function once the insulation coating of the wire has been clamped at a certain constant pressure, by wire clamping cylinder 31, and cut by the wire cutting cylinder 51.

Upon release of the pedal-type switch after the completion of the wire stripping operation, the air pressure in intake pipe 61 dissipates and the wire clamping cylinder 31 and wire cutting cylinder 51, (through the restoration to the original unbiased positions of the springs in cylinders 31, 51) withdraw the clamping block 37 and cutter block 57 from the clamping block 33 and cutter block 53 respectively. Also, due to the release of air pressure in hole a, piston 67 will be restored against one end of hole a by virtue of the force of spring 66. As hole b communicates with bore 651, the air in wire stripping cylinder 40 will speedily exhaust via holes c, b and bores 651, 652, and the spring 49 in wire stripping cylinder 40 will push the cylinder body 40 to the right, to its original position, with rapid speed, so as to be ready for the next operation. The air exhaust and retreat speed of the wire stripping cylinder 40 can be suitably adjusted by muffling governor 68.

Figure 6:
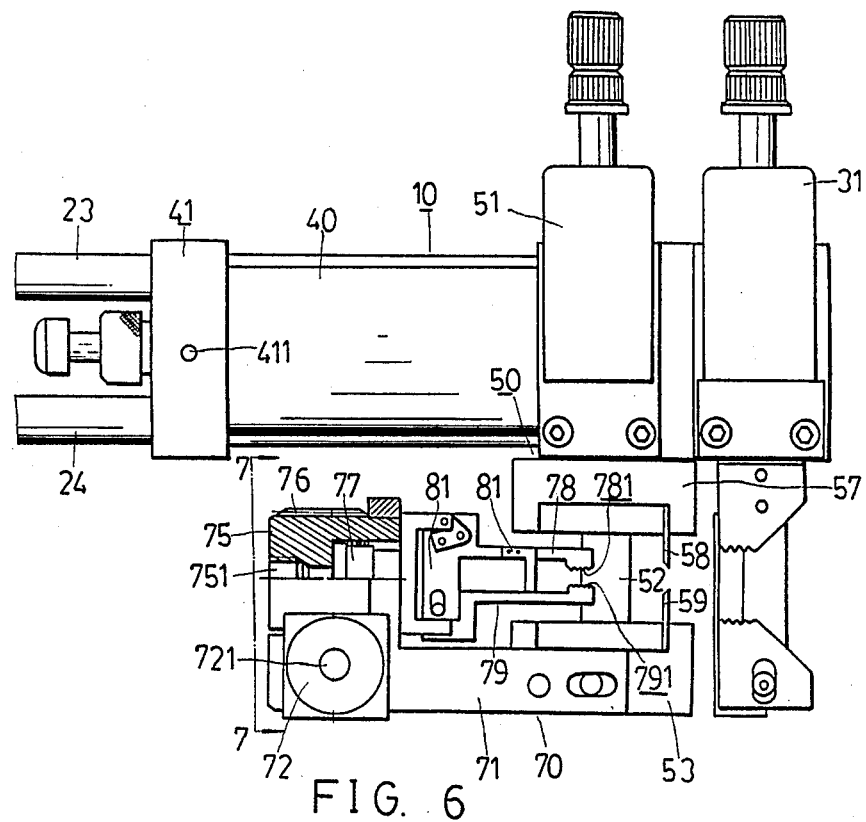
FIG. 6 is a plan view similar to FIG. 2 showing the stripper provided with a twisting device.
Figure 7:
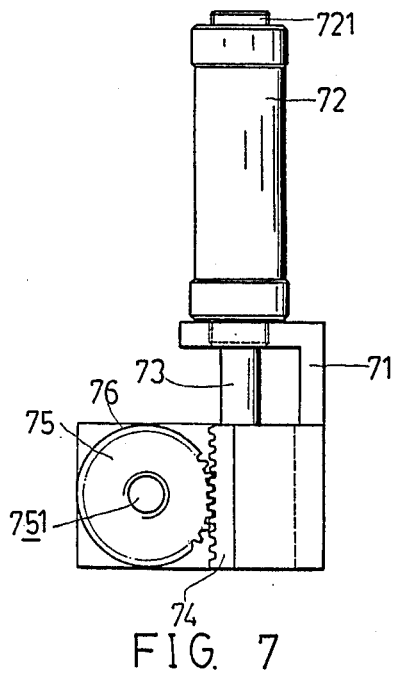
FIG. 7 is a sectional view taken along line 7—7 in Fig. 6.

As shown in FIGS. 6 & 7, another preferred embodiment of the invention includes a wire twisting device 70 installed on the wire cutting device 50 of the pneumatic wire stripper 10. The twisting device 70 includes a support frame 71 mounted on cutter block 53. On top of the support frame 71, there is provided a vertical mini cylinder 72, having an air intake pipe 721 connected to a hole 411 on end cover 41 of wire stripping cylinder 40, so that air can be supplied to cylinder 72 via passage c. A rack 74 is firmly installed at the bottom end of a piston rod 73 of the cylinder 72. A pneumatic robot hand 75 is rotatably mounted on the support frame 71, and has a toothed shell 76 and a piston rod 77 capable of pushing two robot fingers 78, 79 in parallel stretching and clamping actions. The pneumatic robot hand 75 is a single acting cylinder with an air intake pipe 751 connected with the air intake pipe 63 of the wire cutting cylinder 51, so that when a wire is clamped and cut by blades 58, 59 of wire cutting cylinder 51, the free ends 781, 791 of the two fingers 78, 79 will simultaneously and parallelly clamp the work end of the wire. Robot finger 78 is provided with a stop plate 81 which can be suitably translated for stopping and locating the work end of the work wire.

The operation of the wire twisting device 70 is a follows:

When air intake pipe 61 is supplied with air, the wire clamping cylinder 31, wire cutting cylinder 51 and robot hand 75 act simultaneously, causing the wire to be clamped by clamp blocks 33, 37, to be cut by cutter blades 58, 59 and to be clamped by robot fingers 78, 79 at the work end. Then, wire stripping cylinder 40 and wire cutting device 50 are moved leftwards as previously described and also, the cylinder 72 operates piston rod 73 and rack 74 downwardly to cause robot hand 75 to rotate, i.e. the wire is twisted as it is being stripped of its insulating coating so that the insulating coating can twist fine wire strands wrapped therein together. Thus, upon stripping of the insulating coating, a wire twisting operation is also accomplished at the same time, so that wire strands in the work wire are twisted together.

From the two embodiments described above, it can be understood that the invention utilizes a sequence control device 60 for providing wire stripping only after the stripper 10 has suitably clamped and cut the work wire thereby improving its effectiveness. Moreover, the installation of piping holes of the sequence control device 60 are internally provided. Furthermore, using a wire twisting device to provide wire twisting during the wire stripping process improves the quality of wire stripping.

What is claimed is:

1. A pneumatic wire stripper comprising wire clamping jaw means for clamping a wire to be stripped, a first pneumatic piston-cylinder assembly for opening and closing the clamping jaw means, cutting jaw means for cutting through wire insulation, a second pneumatic piston-cylinder means for opening and closing the cutting jaw means, the first and second piston-cylinder assemblies having parallel longitudinal axes, a third pneumatic piston-cylinder assembly including a cylinder having the cutting jaw means mounted thereon and a piston rod attached to the clamping jaw means, the third pneumatic piston-cylinder assembly having a longitudinal axis which is perpendicular to the longitudinal axes of the first and second assemblies for separation of the cutting jaw means from the clamping jaw means upon supply of pressurized air to the third assembly for stripping the insulation from one end of the wire, and sequence control means for providing supply of pressurized air to the third assembly only after the clamping jaw means and cutting jaw means have been operated to clamp a wire and cut the insulation and a predetermined air pressure value has been established in the first and second assemblies, the sequence control means including air passage means connected between the first and second assemblies and the third assembly for supply of air under pressure to the third assembly, and a pressure responsive valve in said passage means for closing the passage means when the pressure in the first and second assemblies is below the predetermined value and for opening the passage means when the pressure exceeds the predetermined value.

2. A wire stripper as claimed in claim 1 wherein the pressure responsive valve comprises a cylinder, a piston in the cylinder, and spring means in the cylinder urging the piston to a position closing the passage means, the piston being pneumatically depressable against the action of the spring means to open the passage means when said pressure exceeds said predetermined value.

3. A wire stripper as claimed in claim 2 including governor means associated with the pressure response of valve for adjusting said predetermined pressure value.

4. A wire stripper as defined in claims 1 wherein the clamping jaw means includes a block carrying a fixed clamping jaw and a block carrying a movable clamping jaw, wherein the piston rod of the third assembly is connected with the block carrying the fixed clamping jaw for movement of the cylinder of the third assembly along the piston rod to separate the cutting jaw means from the clamping jaw means, and wherein said passage means includes a portion extending through the piston rod of the third assembly for delivering air under pressure from the pressure responsive valve into the cylinder of the third assembly when said pressure exceeds said value.

5. A wire stripper as claimed in claim 4 wherein the pressure responsive valve is located in the block carrying the fixed clamping jaw.

6. A wire stripper as claimed in claim 4 including guide rods extending from the block carrying the fixed clamping jaw, wherein the cylinder of the third assembly is mounted for movement along the guide rods.

7. A wire stripper as claimed in claim 6 including an end plate on the guide rods and a resilient buffer means on the cylinder of the third assembly for engagement with the end plate.

8. A wire stripper as claimed in claim 1 which further includes wire twisting jaw means associated with the cutting jaw means, first operating means for clamping the twisting jaw means on the wire in concert with operation of the cutting jaw means, and second operating means for rotating twisting jaw means to twist and end portion of the wire in concert with operation of the third piston cylinder assembly.

9. A wire stripper as claimed in claim 8 wherein the first operating means comprises a fourth piston-cylinder assembly and wherein the second operating means comprises a fifth piston-cylinder assembly having a piston rod with an attached gear rack and a gear wheel meshing with said rack, the gear wheel being associated with said twisting jaw means for rotating the twisting jaw means responsive to linear movement of the rack.

10. A wire stripper as claimed in claim 9 including air supply means for the fifth piston-cylinder assembly, said air supply means being connected with the sequence control means for operation in concert with the third piston-cylinder assembly.

* * * * *